US012675777B2

(12) United States Patent (10) Patent No.: US 12,675,777 B2
Sahara (45) Date of Patent: Jul. 7, 2026

(54) MATCHING SYSTEM FOR METHANE RESOURCE UTILIZING FOOD WASTE

(71) Applicant: TBM CO., LTD., Saitama (JP)

(72) Inventor: Kunihiro Sahara, Tokyo (JP)

(73) Assignee: TBM CO., LTD., Saitama (JP)

( * ) Notice: Subject to any disclaimer, the term of this patent is extended or adjusted under 35 U.S.C. 154(b) by 0 days.

(21) Appl. No.: 18/566,883

(22) PCT Filed: Jun. 7, 2022

(86) PCT No.: PCT/JP2022/022864
§ 371 (c)(1),
(2) Date: Dec. 4, 2023

(87) PCT Pub. No.: WO2023/238211
PCT Pub. Date: Dec. 14, 2023

(65) Prior Publication Data
US 2024/0265353 A1 Aug. 8, 2024

(51) Int. Cl.
*G06Q 10/30* (2023.01)
*B09B 3/60* (2022.01)
(Continued)

(52) U.S. Cl.
CPC .............. *G06Q 10/30* (2013.01); *B09B 3/60* (2022.01); *G06Q 10/06315* (2013.01);
(Continued)

(58) Field of Classification Search
CPC ...... G06Q 10/30; B09B 3/60; B09B 2101/70; Y02P 90/845; Y02P 90/90; Y02E 50/30; Y02W 10/10
See application file for complete search history.

(56) References Cited

U.S. PATENT DOCUMENTS 10,472,721 B1 * 11/2019 Parker ...................... C25B 1/24
2015/0114061 A1 * 4/2015 Begin ..................... C05F 11/00
71/10

FOREIGN PATENT DOCUMENTS

JP        2002366641 A  * 12/2002
JP        2007098369 A  * 4/2007
(Continued)

OTHER PUBLICATIONS

V. Anbarasu, P. Karthikeyan and S. P. Anandaraj, "Turning Human and Food Waste into Reusable Energy in a Multilevel Apartment Using IoT," 2020 6th International Conference on Advanced Computing and Communication Systems (ICACCS), Coimbatore, India, 2020, pp. 440-444, (Year: 2020).*
(Continued)

*Primary Examiner* — Wenren Chen
(74) *Attorney, Agent, or Firm* — Perilla Knox & Hildebrandt LLP; Kenneth A. Knox

(57) ABSTRACT

A methane resource matching system include a first terminal device that is equipped at a source of food waste, and that inputs information relating to food waste; a second terminal device that is equipped at a biogas plant, and that inputs information relating to an operating status at the biogas plant; a third terminal device that is equipped at a support company, which investigates the source of food waste and the biogas plant, and that inputs information relating the food waste at the source and the operating status at the biogas plant; and a management server that is equipped at a general headquarters, which oversees the bio-gasification of food waste, and that manages the source of food waste, the biogas plant, and the bio-gasification of food waste at the support company. The first terminal device, the second terminal device, the third terminal device, and the management server are connected to one another via the network.

12 Claims, 11 Drawing Sheets

(51) Int. Cl.

| | |
|---|---|
| B09B 3/65 | (2022.01) |
| B09B 101/70 | (2022.01) |
| G06Q 10/0631 | (2023.01) |

(52) U.S. Cl.
CPC ......... *B09B 2101/70* (2022.01); *Y02P 90/845* (2015.11); *Y02P 90/90* (2015.11)

(56) References Cited

FOREIGN PATENT DOCUMENTS

| | | | |
|---|---|---|---|
| JP | 5452814 | B2 | 3/2014 |
| JP | 2014217804 | A | 11/2014 |
| JP | 3216173 | U | 5/2018 |
| JP | 2019125337 | A | 7/2019 |
| JP | 2022083178 | A | 6/2022 |
| WO | WO-2022054261 | A1 * | 3/2022 |

OTHER PUBLICATIONS

International Search Report and Written Opinion for International Application No. PCT/JP2022/22864 of Jul. 26, 2022.
"Achieving carbon neutrality toward 2050", Searched on May 20, 2022, <URL: https://www.env.go.jp/earth/2050carbon_neutral.html> (Last visited: Dec. 4, 2023).
Notice of Reasons for Refusal for JP Patent Application No. 2022-534343 of Jul. 11, 2022.
Decision to Grant for JP Patent Application No. 2022-534343 of Feb. 8, 2023.
Office Action for EP Patent Application No. 22944070.6 of Jun. 2, 2025.
Office Action for AU Patent Application No. 2022460772 of Dec. 13, 2024.

* cited by examiner

Fig. 4

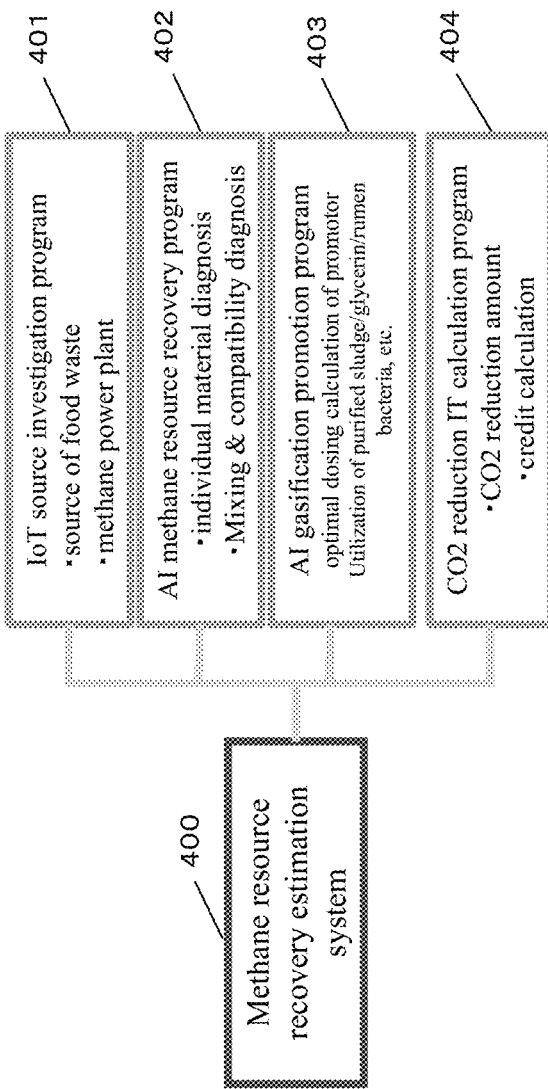

401
IoT source investigation program
• source of food waste
• methane power plant 402
AI methane resource recovery program
• individual material diagnosis
• Mixing & compatibility diagnosis 403
AI gasification promotion program
optimal dosing calculation of promotor
Utilization of purified sludge/glycerin/rumen bacteria, etc.

404
CO2 reduction IT calculation program
• CO2 reduction amount
• credit calculation 400
Methane resource recovery estimation system

Biogasification promotor

500

| | | | |
|---|---|---|---|
| Auxiliary raw materials | Gases such as sludge and cow dung | Methane fermentation 30t/day → Gas 900m3/day | Gas yeild 30m3/t |
| | Raw materials with low gas yield such as sludge and cow dung 29t/day +Purified sludge 1t/day | Methane fermentation 30t/day → Gas 960m3/day | Gas yeild 32m3/t |
| Nutritional supplements | Food waste materials 30t/day | Methane fermentation 30t/day → Gas 4000m3/day | Gas yeild 133m3/t |
| | Food waste materials 30t/day + Ni, Co, e | Methane fermentation 30t/day → Gas 4800m3/day | The rate of increase in gas yield varies on a case-by-case basis depending on Ni and Co deficiency in the raw materials. |

(b)

501

| Gasification promotor | Variety | Condition | Biogas generation amount (m3/t-wet) | |
|---|---|---|---|---|
| | | | Standard | When using promotor |
| Purified sludge | Auxiliary raw materials | Effective when there are many raw materials with low methane yield, such as sludge and livestock manure | 60~90 | None |
| Glycerin | Auxiliary raw materials | | 300 | None |
| Rumen bacteria | Promotor | Cellulose raw material | 150(paper) | 150-300(paper) |
| Nutritional supplement | Nutritional supplement | Food waste | 130(kitchen waste) | 130-160(kitchen waste) |

By 2050, more than 1 million tons of business food waste will need to be used as methane per year, and supporting this will contribute to reducing CO2 emissions by 50 million KWh and 20,000 tons.

Assumptions in 2050 and estimation of contribution effect by TBM

Amount of equipment installed for mixing treatment and methane power generation from food waste
2021: 34,000 KWh ⇒ 2050: 283,000 KWh Estimated amount of business-related food waste processed at both facilities
2021: 80,000 tons/year ⇒ 2050: 1.2 million tons/year If the methane recycling diagnosis and prediction system is used for 30% of business food waste that is processed for methane,
TBM matching amount: 360,000 tons
Power generation contribution fee 53.56 million KWh/year
CO2 reduction: 23,618 tons CO2/year According to the outlook for the introduction of methane power generation by the Japan Organic Resources Association, methane power generation using food waste and mixed materials is expected to increase in the future, instead of using livestock manure and sewage sludge, which have a high recycling rate such as composting.

Expected introduction of methane power generation (JORA 2021 estimate)

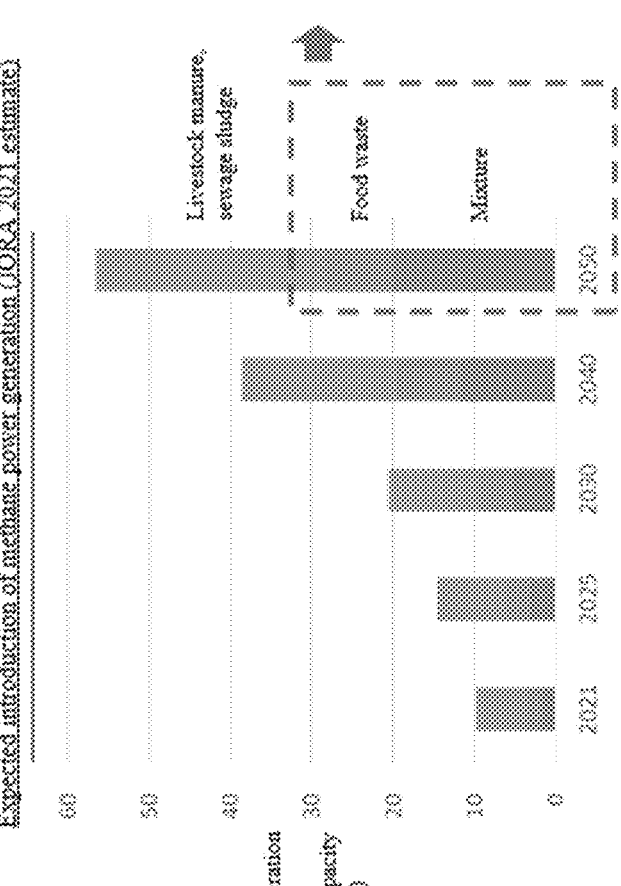

Livestock manure, sewage sludge

Food waste

Mixture

Power generation equipment installed capacity (10,000Kw)

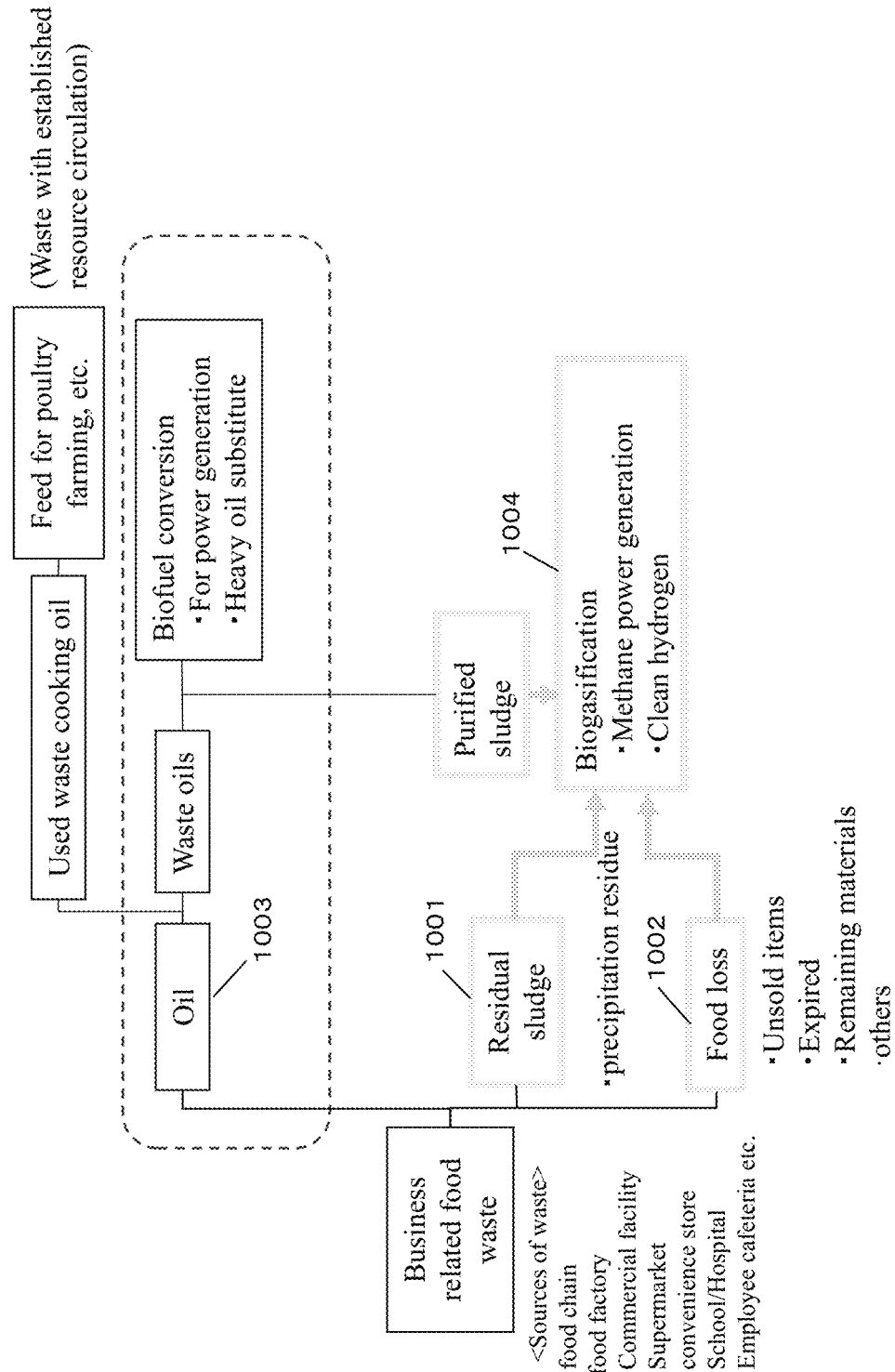

(Waste with established resource circulation)

Feed for poultry farming, etc.

Biofuel conversion
• For power generation
• Heavy oil substitute

Used waste cooking oil

Waste oils

Oil

1003

Purified sludge

1004

Biogasification
• Methane power generation
• Clean hydrogen

Residual sludge

1001

•precipitation residue

1002

Food loss

Business related food waste

• Unsold items
• Expired
• Remaining materials
•others

<Sources of waste>
food chain
food factory
Commercial facility
Supermarket
convenience store
School/Hospital
Employee cafeteria etc.

Figure 11:
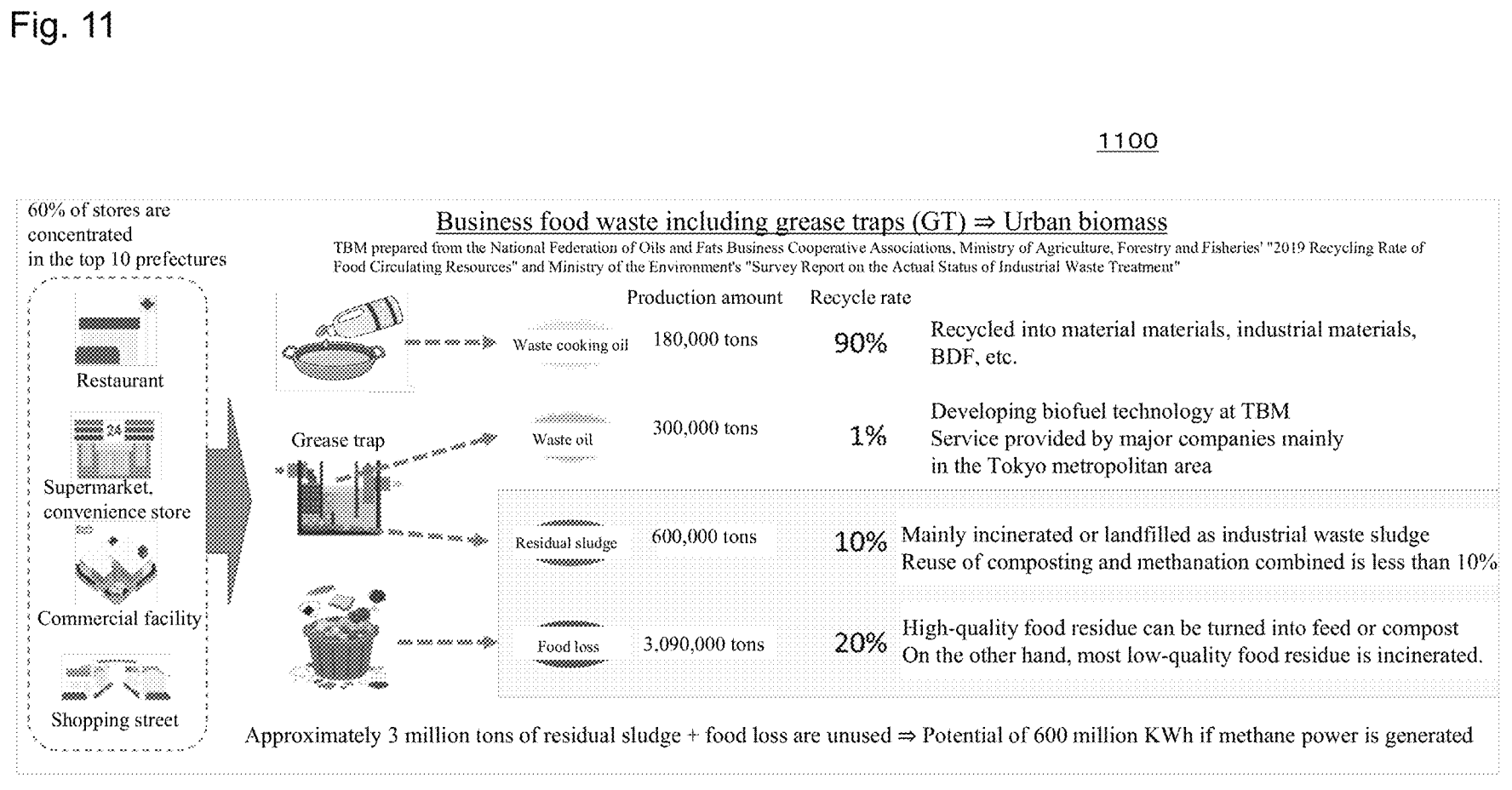

Business food waste including grease traps (GT) ⇒ Urban biomass

TBM prepared from the National Federation of Oils and Fats Business Cooperative Associations, Ministry of Agriculture, Forestry and Fisheries' "2019 Recycling Rate of Food Circulating Resources" and Ministry of the Environment's "Survey Report on the Actual Status of Industrial Waste Treatment"

60% of stores are concentrated in the top 10 prefectures

Restaurant
Supermarket, convenience store
Commercial facility
Shopping street

| | Production amount | Recycle rate | |
|---|---|---|---|
| Waste cooking oil | 180,000 tons | 90% | Recycled into material materials, industrial materials, BDF, etc. |
| Waste oil | 300,000 tons | 1% | Developing biofuel technology at TBM Service provided by major companies mainly in the Tokyo metropolitan area |
| Residual sludge | 600,000 tons | 10% | Mainly incinerated or landfilled as industrial waste sludge Reuse of composting and methanation combined is less than 10% |
| Food loss | 3,090,000 tons | 20% | High-quality food residue can be turned into feed or compost On the other hand, most low-quality food residue is incinerated. |

Grease trap

Approximately 3 million tons of residual sludge + food loss are unused ⇒ Potential of 600 million KWh if methane power is generated

MATCHING SYSTEM FOR METHANE RESOURCE UTILIZING FOOD WASTE

CROSS-REFERENCE TO RELATED APPLICATION

The present disclosure is a national phase application under 35 U.S.C. § 371 of International Application No. PCT/JP2022/22864 filed Jun. 7, 2022, the contents of which being incorporated by reference in their entirety herein.

TECHNICAL FIELD

The present disclosure relates to a methane resource matching system utilizing food waste, wherein the system is to optimally match a source of food waste such as restaurants and food factories with a biogas plant that performs methane fermentation and methane gasification using food waste.

BACKGROUND

Recently the problem of global warming has become more and more serious. Efforts have been made to reduce the emission of greenhouse gas such as carbon dioxide gas and methane gas. The Japanese Ministry of the Environment has set a goal of achieving carbon neutrality, where CO2 (carbon dioxide) emissions will be reduced to practically zero by 2050, in order to achieve a decarbonized society (for example, refer to Non-Patent Document 1).

There are various ways to reduce CO2, such as the introduction of renewable energy equipment like solar and wind power generation, the introduction of energy-saving products such as heat pumps, and forest management activities. Recycling biomass (recycling food waste) is also thought to be one of them.

The sources of food waste are mainly citizens and businesses. Food wasted from businesses is considered as business waste and is treated as industrial waste. As shown in FIG. 10, business-related food waste is classified into oil 1001, residual sludge 1002, and food loss 1003. Among these, "Oil 1001 (wastewater oil)" is a biomass resource discharged from restaurants, food factories, etc. This weighs more than 300,000 tons in a year in Japan. If it is expanded to a global scale, the amount will be extremely huge. Recently, a biomass generation system using a diesel generator has been developed in order to produce original biomass fuels from waste oil, which was only used to be wasted as industrial sludge (for example, refer to Patent Documents 1 to 3). With this biomass generation system, CO2 reduction, recycling, and water purification can be achieved.

On the other hand, there remain issues in promoting the recycling of "residual sludge 1002" and "food loss 1003" among business-related food waste. As shown in Table 1100 in FIG. 11, about 3 million tons of this residual sludge and food loss are currently unused per year in Japan, as a whole. However, if these can be used for methane power generation, it has the potential to generate about 600 million kWh of electricity per year. Even in major food and beverage chains such as McDonald's (registered trademark) and Kentucky Fried Chicken (registered trademark), these food wastes are currently being disposed of as industrial waste and are not being utilized.

CITATION LIST

Patent Document

[Patent document 1] JP2014-217804A
[Patent document 2] Japanese Patent No. 5452814
[Patent document 3] Publication of Utility Model Registration No. 3216173

Non-Patent Document

[Non-patent document 1]"Achieving carbon neutrality toward 2050" (Searched on May 20, 2022), <URL: https://www.env.go.jp/earth/2050carbon_neutral.html>.

BRIEF SUMMARY

The first step in turning unused sludge into a resource is to turn it into biogas 1004 (methane power generation, green hydrogen) at a biogas plant that performs methane fermentation. In particular, in terms of methane power generation, biogas as per ton of raw material produced from business-related food waste (including residual sludge) is 5 to 10 times bigger than the biogas produced from livestock manure and sewage sludge, which used to be the main raw materials for conventional methane gas production. Therefore, methane power generation based on methane treatment of food residue or mixing with livestock manure etc, is recommended.

However, since the properties of food waste are unstable, the actual operating rate at a biogas plant is currently as low as 38 to 49%. There is a need to recycle food waste as a resource. However, the main reasons why methane utilization has not progressed will be explained below.

First, although it is important to pre-diagnose unstable food waste before operating it at a biogas plant, currently, services for estimating the amount of gas generation are extremely expensive at the cost of 200,000 to 500,000 yen per sample. In addition, the discharged amount of food waste frequently changes depending on the season, and it is extremely difficult to diagnose food waste in small lots in advance. As a result of this, biogas plants cannot predict the amount of gas generated, so they place top priority on avoiding fermentation defects and maintaining stable operation, and do not easily accept new raw materials. So far, the usage rate of biogas plants is low due to using limited raw materials.

Second, if it is possible to evaluate in advance the amount of gas generated and operation behavior when a biogas plant receives and mixes existing main raw materials such as livestock manure with new commercial food waste, more appropriate operation management would be possible. However, the accuracy of the current preliminary evaluation is low; which results in a factor preventing residual sludge and food loss from recycling.

Third, if there is an excess or deficiency of nutrients (sulfur, nitrogen, oil, etc.) required for methane bacteria to ferment, or if lipase, which promotes the decomposition of cellulose, is insufficient, sufficient fermentation may not occur. As a result, the amount of gas generated will be lower than expected. Currently, biogas plants do not have the ability to determine the optimal gasification promotion method to improve the amount of gas generated, or to properly judge the type and amount of gasification accelerator, which is added. This results in a low capacity utilization rate.

Fourth, at present, the observation data for the core system of food waste resource utilization is scattered across stores and food factories that produce food waste, as well as biogas plants that use the food waste. Therefore, mutual utilization of information has not been realized yet. As a result, it is difficult to understand what kind and amount of food waste each store or food factory has or what kind and amount of methane material a biogas plant needs. This makes it difficult to understand the interoperability and portability of biomass resources. As a result, the creation of new services and new businesses in this field has not been achieved yet.

The present disclosure has been made in view of the above-mentioned problems and has an objective to provide a methane resource matching system utilizing food waste that optimally matches a source of food, which waste residual sludge, food loss and so on, with a biogas plant which performs methane gasification using food waste, and that improves operating rate at a biogas plant, and that can contribute to the realization of a decarbonized society in the end.

In order to solve the abovementioned issues, a methane resource matching system utilizing food waste, which matches food waste as a biomass resource and a source of the food waste with a biogas plant that performs bio-gasification using the food waste, the methane resource matching system utilizing food waste comprising: a first terminal device that is equipped at the source of food waste, and that inputs information relating to food waste: a second terminal device that is equipped at the biogas plant, and that inputs information relating to an operating status at the biogas plant: a third terminal device that is equipped at a support company, which investigates the source of food waste and the biogas plant, and that inputs information relating to food waste at the source and the operating status at the biogas plant; and a management server that is equipped at a general headquarters, which oversees the bio-gasification of food waste, and that manages the source of food waste, the biogas plant, and the bio-gasification of food waste at the support company, wherein the first terminal device, the second terminal device, the third terminal device, and the management server are connected to one another via the network.

In this methane resource matching system utilizing food waste, optionally, wherein the management server comprising: a control unit that performs control to realize information processing of the methane resource matching system based on a program: a database: a matching judgement unit that compares types, amounts and properties of food waste at the source of food waste registered in the database with the operating status at the biogas plant, and that identifies suitable food waste; and a transmitting/receiving unit that is connected to the Internet, and that transmits and receives data between the first terminal device, the second terminal device and the third terminal device.

In this methane resource matching system utilizing food waste, optionally, wherein the matching judgement unit identifies at least one of BMP (Bio Methane Potential), loss on ignition, carbohydrates, proteins, lipids, water content, N (nitrogen) concentration, and PH based on types and properties of food waste, which are received via the transmitting/receiving unit, and classifies the food waste into carbohydrate-rich, fat-rich, nitrogen/sulfur-rich and fiber-rich, and matches food waste and the source of food waste with biogas plant based on said classification.

In this methane resource matching system utilizing food waste, optionally, wherein the database stores an IoT source investigation program as the program, wherein the IoT source investigation program grasps types, amounts and properties of food waste, which are held by the source of food waste, based on input data and photographs of the source regarding food waste sent from the first terminal device, the second terminal device, and the third terminal device, and wherein the IoT source investigation program grasps types and amounts of methane materials required by the gas plant based on types and properties of existing raw materials, gas production amounts, power generation status, and requests, which are sent from the second terminal device.

In this methane resource matching system utilizing food waste, optionally, wherein the database stores an AI methane resource recovery program, an AI gasification promotion program, and a $CO_2$ reduction IT calculation program as the program, wherein the AI methane resource recovery program predicts methane yield of food waste, and performs synergy prediction and diagnose inhibition when multiple materials are mixed with existing raw materials at the biogas plant, based on input data and photographs of the source regarding food waste sent from the first terminal device and the third terminal device, wherein the AI gasification promotion program performs an optimal gasification promotion method and predicts an optimal input amount and effect of gasification promoters, and wherein the $CO_2$ reduction IT calculation program estimates an amount of methane gas generated and an amount of $CO_2$ reduction based on varieties or collection amount of food waste, which is used as raw material at the biogas plant, and calculates carbon credits.

In order to solve the abovementioned issues, a methane resource matching method utilizing food waste, which matches food waste as a biomass resource and a source of the food waste with a biogas plant that performs bio-gasification using the food waste, the methane resource matching method utilizing food waste including: a receiving step of receiving information relating to food waste from a first terminal device, which is equipped at the source of food waste: a power generation status receiving step of receiving a gas production amount or power generation status from a second terminal device, which is equipped at the biogas plant; and a matching step of matching the source of food waste with the biogas plant that performs bio-gasification using the food waste, based on the information relating to food waste in the receiving step and the gas production amount or power generation status at the biogas plant.

In this methane resource matching method utilizing food waste, optionally, wherein types, amounts and properties of food waste at the source of food waste are compared with the operating status at the biogas plant, and suitable food waste and a suitable source of food waste are identified in the matching step.

In order to solve the abovementioned issues, a program that executes specific processes in a computer, which manages a source of food waste as a biomass resource and a biogas plant that performs bio-gasification using the food waste, the program includes: a receiving step of receiving information relating to food waste from a first terminal device, which is equipped at the source of food waste: a power generation status receiving step of receiving a gas production amount or power generation status from a second terminal device, which is equipped at the biogas plant; and a matching step of matching the source of food waste with the biogas plant that performs bio-gasification using the food waste, based on the information relating to food waste in the receiving step and the gas production amount or power generation status at the biogas plant.

The methane resource matching system utilizing food waste according to the present disclosure comprises: a first terminal device that is equipped at the source of food waste, and that inputs information relating to food waste: a second terminal device that is equipped at the biogas plant, and that inputs information relating to an operating status at the biogas plant: a third terminal device that is equipped at a support company, which investigates the source of food waste and the biogas plant, and that inputs information relating the food waste at the source and the operating status at the biogas plant; and a management server that is equipped at a general headquarters, which oversees the bio-gasification of food waste, and that manages the source of food waste, the biogas plant and the bio-gasification of food waste at the support company, wherein the first terminal device, the second terminal device, the third terminal device and the management server are connected to one another via the network. With this configuration, the methane resource matching system can matches a source food waste, which waste residual sludge, food loss and so on, with a biogas plant which performs methane gasification using food waste, and that improves operating rate at a biogas plant, and that can contribute to the realization of a decarbonized society in the end.

BRIEF DESCRIPTION OF DRAWINGS

FIG. 4 is an explanatory diagram of a program used for the methane resource matching system.

FIG. 5 is a diagram showing an actual example of biogasification promotion using a gasification promoter.

FIG. 9 is an explanatory diagram of future prediction when the methane resource matching system is used.

FIG. 10 is a diagram showing the classification of business-related food waste.

FIG. 11 is a diagram showing the current problems with residual sludge and food loss.

DETAILED DESCRIPTION

Embodiment

A methane resource matching system utilizing food waste according to an embodiment of the present disclosure will be described with reference to the figures. This methane resource matching system is part of a decarbonization resource recovery service that supplies optimal food waste from food waste chains, etc., which are the source of food waste, depending on the operating status at the biogas plant operator. In the description of this embodiment, food waste means residual sludge (including purified sludge) and food loss, and does not include wastewater oils and fats. Furthermore, sources of food waste include, for example, restaurant chains, food factories, commercial facilities, supermarkets, convenience stores, hotels, schools/hospitals, and employee cafeterias.

<Overall Process Figure>

Figure 1:
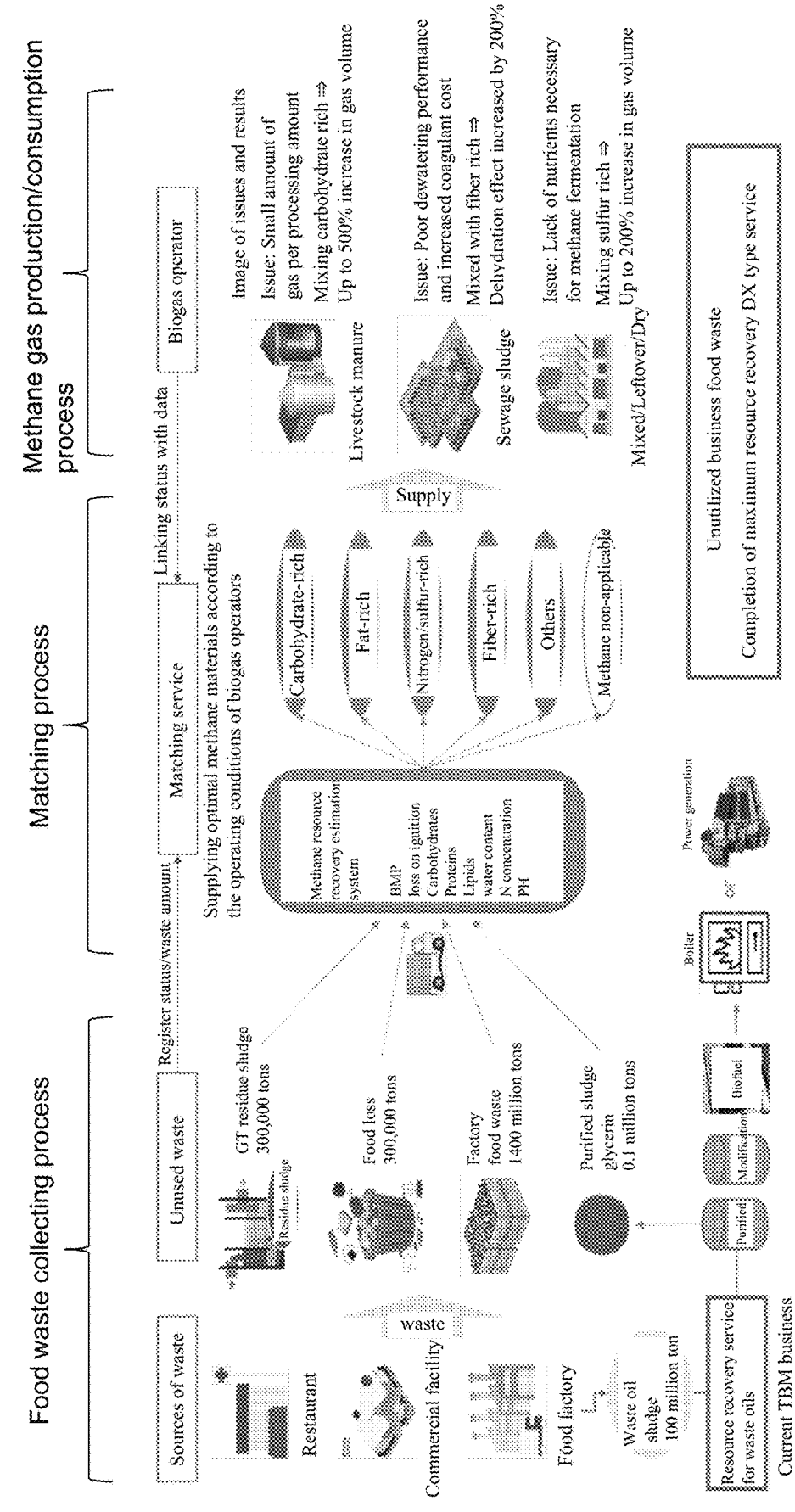
FIG. 1 is an overall process diagram of a core system including a methane resource matching system according to an embodiment of the present disclosure.

First, an overview of the overall process of a methane resource recovery service including the methane resource matching system (hereinafter referred to as a matching system) according to the present embodiment, will be described with reference to FIG. 1. As shown in FIG. 1, the methane resource recovery service mainly includes a methane material collecting process, a matching process, and a methane gas production/consumption process.

First, in the methane material collecting process, residual sludge (sedimentation residue), food loss, factory food waste, purified sludge, etc. are collected from the biomass discharged from sources of food waste such as restaurants and food factories. Herein, biomass refers to "renewable organic resources based on living organisms, excluding fossil resources." Among biomass, waste biomass includes discarded paper, livestock manure, food waste, sewage sludge, etc. The $CO_2$ emitted by burning biomass is the $CO_2$ absorbed from the atmosphere through photosynthesis during the growth process of living organisms. Therefore, replacing energy and products derived from fossil resources with biomass can greatly contribute to reducing $CO_2$ emissions, wherein $CO_2$ is one of the greenhouse gases that cause global warming.

In general, a lot of food loss (unsold, expired, leftover ingredients, etc.) is generated every day from food waste sources such as food restaurants, fast food restaurants, restaurants, hotels, and food processing plants. These are collected as methane resources. Furthermore, wastewater from food waste sources contains various water pollutants. If such wastewater is drained without any treatment, oil and other substances in the wastewater will stick onto drain pipes and be solidified. This causes the drain pipes to become clogged. As a result, purifying water in combined treatment tanks and purifying water at sewage treatment plants become difficult. In addition, it may cause a negative impact on the environment.

Therefore, facilities for dumping wastewater, including solid substances such as floating substances, comprise processing units (grease trap), oil/water separation tank, and raw water tank in order to pool wastewater for the time being or to deposit solid substances, or to float and separate oil, or to remove these temporarily for physical removal.

In the methane material collecting process, a field agent, which is, for example, a working company, manages the cleaning of grease traps at restaurants, etc., and collects residual sludge from the grease traps. Herein, the device disclosed in U.S. Pat. No. 4,401,007, the device disclosed in U.S. Pat. No. 4,420,750, and the device disclosed in utility patent No. 3216173 are applicable as a technology to collect biomass from a grease trap. The applicant owns these patents.

Other field agents are, for example, agents that manage oil/water separation tanks at food factories that produce box lunches, frozen foods, and meat products, and collect biomass from the oil/water separation tanks. Specifically, oil sludge obtained from the oil/water separation tank at a food factory is separated into oil, water, and sludge using an oil sludge separation apparatus, and the sludge (residual sludge) is collected. The field agent may also manage the oil sludge separation apparatus.

Figure 2:
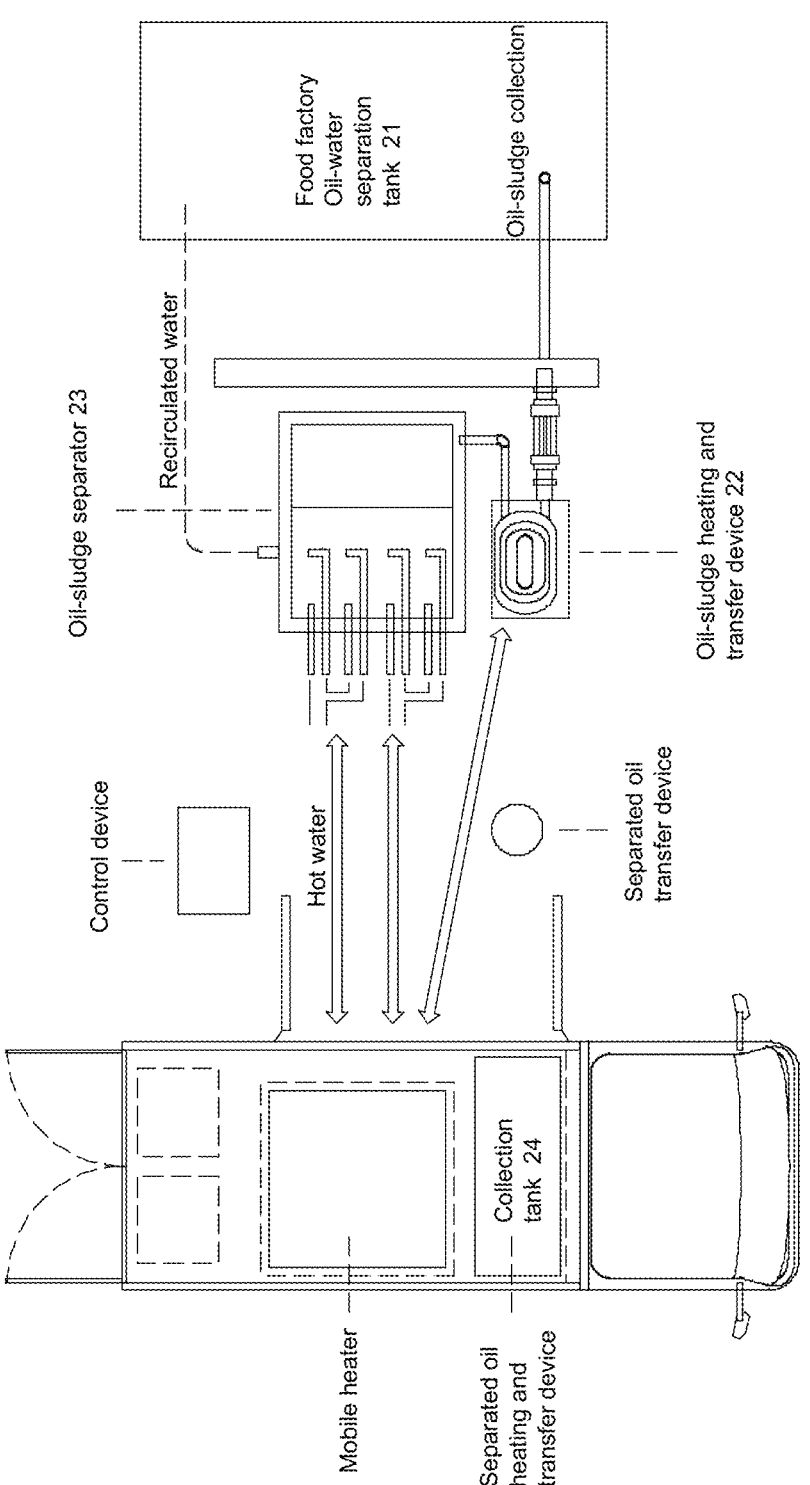
FIG. 2 is a diagram showing an example of an oil/mud separation device included in the core system.

For the oil sludge separation apparatus, the applicant's technology as shown in FIG. 2, for example, may be used. Concretely, oil sludges are collected from the oil/water separation tank 21 at a food factory via an oil-sludge heating and transfer device 22 and said oil sludges are transferred in the oil-sludge separator 23. In the heated oil-sludge separator 23, water and sludge with a bigger specific gravity settle down, on the other hand, oil with a smaller specific gravity goes up. Therefore, sludge in the lower layer can be collected. Herein, PCM (Phase Change Material) equipped with a track is used for a mobile heater for heating the oil-sludge heating and transfer device 22 and the oil-sludge separator 23. The sludge collected will be delivered into the methane gas production/consumption process.

Next, in the matching process, food waste collected from restaurants, food factories, etc. in the methane material collecting process, and a biogas plant that uses this food waste to produce methane gas, are optimally connected using IoT (Internet of Things) and AI (Artificial Intelligence) in order to improve equipment utilization rate and productivity at biogas plants.

In this matching process, for example, food waste that has been treated as waste is classified into carbohydrate-rich, lipid-rich, etc., and presents the types, mixing ratios, and quantities of food waste that can serve as an appropriate methane resource according to conditions such as requests and operational status (for example, methane resources used and power generation status) from biomass plants. Collection and supply services can be provided. This will provide food-related businesses with various values such as waste reduction, decarbonization, and cost reductions. In addition, by supplying the optimal methane materials to individual biogas plants, values such as stabilizing gas volume and fermentation, and reducing operating costs will be created. The amount of electricity generated will increase in proportion to the increase in gas production, which can contribute to a decarbonization.

Next, in the methane gas production/consumption process, the biogas plant operator produces biogas (methane gas) from the biomass (livestock manure, sewage sludge, mixed/leftover/dry) brought into the biogas plant after the above matching process. Said biogas is generated by fermenting livestock manure, food loss, and residual sludge in a fermentation tank, and is generally stored in a gas holder and then used for power generation. In the future, it is expected that this methane gas will be reformed and used as green hydrogen based on non-fossil fuels.

Herein, businesses, which have introduced a biofuel (methane gas) produced from food waste, are entitled to receive carbon credits. In a case when a business has a CO2 reduction target, the amount more than the target will become CO2 reduction credits. In a case when a small business entity does not have any CO2 reduction target, all amounts will become saved as carbon credits. In Japan, said carbon credit can be sold via a J-credit system operated and can be sold overseas using the carbon credit trading system established by each country.

<Whole System Figure>

Figure 3:
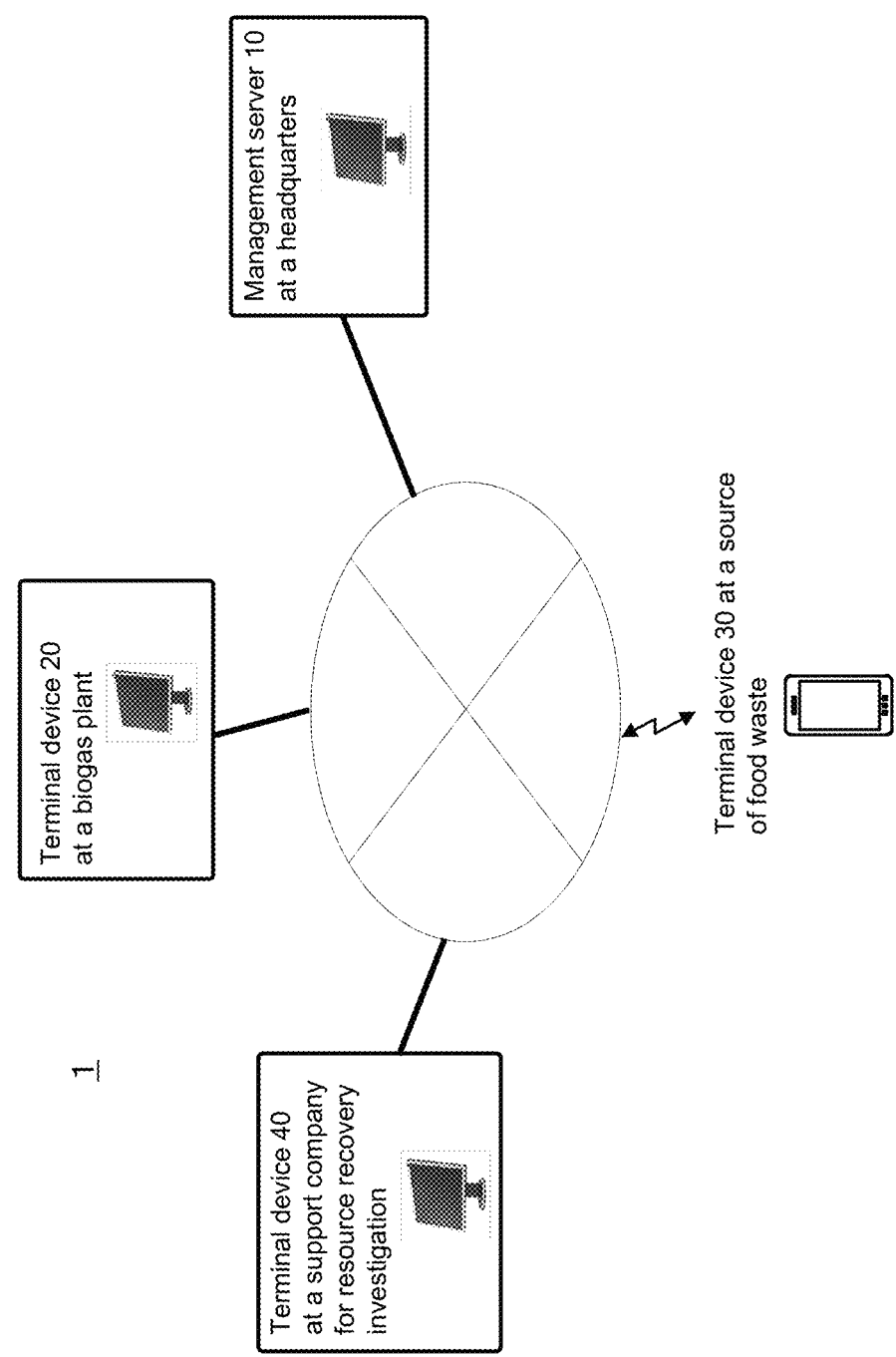
FIG. 3 is a whole configuration diagram of the methane resource matching system.

Next, the whole system relating to the matching system 1 according to this embodiment will be explained by referring to FIG. 3. The matching system 1 comprises a management server 10 provided at a general headquarter, a terminal device (second terminal device) 20 at a biogas plant, and a terminal device (first terminal device) 30 at a source of food waste such as a restaurant chain, food factory, hotel, or commercial facility, and a terminal device (third terminal device) 40 at a resource investigate support company, wherein these are connected to one another via a wide area network such as the Internet.

The terminal device 20 is a device, such as a personal computer or a smartphone, provided in a biogas plant that converts food waste into biogas (also referred to as methane gasification or methane resource recovery). An application, which is specialized for matching and field investigation to input basic data relating to methane gasification, is installed in the terminal device 20, and the result will be displayed on the screen. The terminal device 20 establishes a session with the management server 10 based on a specific protocol and carries out sending/receiving data, files, and so on relating to management of methane materials, methane gas generation amount and methane power generation at biogas plants. Further, the terminal device 20 transmits a request for desired methane material to the management server 10 in an HTTP request format and the like.

The terminal device 30 is a device, such as a smartphone, that is equipped at the source of food waste or at the head office of said source, and is used to input information regarding the food waste to be discharged. The terminal device 30 installs and executes a specialized application for source investigation program and matching in order to input basic matching data for methane resource recovery and displays the results on the screen. This specialized application is such as a web application visualizing the management of the collection of food waste to be discharged. The terminal device 30 establishes a communication session with the terminal device 40 at the support company and the management server 10 based on a predetermined protocol, and sends/receives photos of food waste, data and files related to the management of food waste and wastewater oils and fats.

The terminal device 40 is equipped at the support company that investigates food waste, and is a device such as a smartphone or a personal computer that inputs information regarding food waste at a source of food waste, raw materials as well as operating status at a biogas plant. The terminal device 40 executes a specialized application and displays the result on the screen. The terminal device 40 sends/receives data and files between the terminal devices 20, 30 and the management server 10 based on a predetermined protocol. Further, the terminal device 40 acquires information regarding newly discharged food waste from the terminal device 30 and information desired by the biogas plant from the terminal device 20 in the form of an HTTP request and the like. Then the terminal device 40 efficiently matches the source of food waste with the biogas plant based on the optimal methanation material matching.

The management server 10 is equipped at a general headquarters which oversees the bio-gasification of food waste, and that manages the bio-gasification of food waste at sources of food waste and biogas plants. Specifically, the management server 10 obtains information relating to raw materials used and operating conditions of the biogas plant from the terminal device 20 or 30, and food waste discharged from the terminal device 30 or 40. The management server 10 efficiently executes methane resource recovery. In this case, the management server 10 centrally manages the initial matching service, resource recovery service, and CO2 reduction management service by mainly executing the four programs 401 to 404 shown in FIG. 4. The four programs 401 to 404 executed on the management server 10 will be described in detail below.

(1) IoT Source Investigation Program

The IoT source investigation program 401 grasps the type, amount, and properties of methane materials held by sources of food waste based on input data and photographs of the sources regarding food waste sent from the terminal device 30 or 40 via a smartphone app, etc. The IoT source investigation program 401 also grasps the type and amount of methane materials required by the methane gas plant based on the gas production amount or power generation status and requests sent from the terminal device 20 or 30 of the biogas plant. In other words, the management server 10 obtains data regarding the source investigation program and the amount of gas produced or power generation of the biogas plant from the terminal devices 20, 30, and 40 by using the IoT source investigation program 401. As a result, the management server 10 centrally manages food waste data at sources of food waste such as food factories, which were conventionally dispersed, and the gas production amount or power generation status at biogas plants. This can improve the efficiency and productivity of methane gas generation or methane power generation.

Specifically, sources of food waste use mobile devices such as smartphones (terminal device 30), biogas plants utilize mobile devices such as smartphones (terminal device 20), and support companies use mobile devices such as smartphones (terminal device 40), and data can be instantly uploaded to the cloud (information can also be utilized as big data) without having to physically going to the sources. Then, the management server 10 grasps the status at food waste sources and biogas plants based on the IoT source investigation program 401. As a result, the time required to process data related to source investigation programs, which previously required 30 minutes per site, can be reduced to 1 minute per site after using this program.

(2) AI Methane Resource Recovery Program

The management server 10 predicts methane yield for each individual material and diagnose inhibition when multiple materials are mixed with existing raw materials by using the AI methane resource recovery program 402 based on past research data, new analytical data, actual operational data, etc. Herein, the methane yield is an estimated value of the amount of methane produced per decomposition VS (organic content) of food waste, which is a raw material. Furthermore, synergy prediction means predicting the synergistic effect on methane yield when different types of methane materials are mixed.

For example, food waste can be classified into carbohydrate-rich, fat-rich, nitrogen/sulfur-rich, fiber-rich, and others based on information such as BMP (Bio Methane Potential), loss on ignition, carbohydrates, proteins, lipids, water content, N (nitrogen) concentration, PH, etc. The management server 10 constructs a highly accurate prediction model and applies highly accurate methane yield prediction formulas for these individual materials by using the AI methane resource recovery program 402. In addition, estimation formulas, which include new analysis methods, nutrients, inhibition caused by oils and fats, and synergies due to raw material mixtures, can be constructed and applied. This allows the management server 10 at the headquarters to centrally manage the evaluation of energy conversion equipment and raw materials for methane fermentation.

Specifically, when determining individual materials, methane yield and other basic data (actual data) are stored in a learning database for each raw material, such as residual sludge and food loss for methane fermentation. Then machine learning through mathematical calculations and correction of actual measured values will be performed and big data will be created. This AI methane resource recovery program 402 makes it possible to estimate with high accuracy the possibility of methane resource recovery for each individual material. As a result, the basic determination of the possibility of methane resource recovery previously required 180 days/1 raw material, but after using the AI methane resource recovery program 402, it can be completed in 2 seconds/1 raw material.

In addition, in terms of mixed material judgment and compatibility diagnosis between different materials, the individual material diagnosis AI stores methane yield data (actual data) of mixed raw materials in a learning database. Then machine learning through mathematical calculations and correction of actual measured values will be performed and big data will be created. As a result of this, mixing of methane materials and compatibility determination can be estimated with high accuracy. Conventionally, it took 180 days, but after applying the AI methane resource recovery program 402, it becomes 2 seconds per mixed raw material.

(3) AI Gasification Promotion Program

The management server 10 determines the optimal gasification promotion method and predicts the optimal input amount and effect of gasification promoters such as nitrogen, sulfur, fats and oils, and lipase by using the AI gasification promotion program 403 in order to solve estimated inhibiting factors and utilize low methane yield materials.

Specifically, the AI gasification promotion program 403 is used to determine the optimal gasification promotion method according to the type, amount, and properties of food waste. Then, calculating the mixing ratio of raw materials and calculating the optimal dosage of accelerator (use of purified sludge, glycerin, rumen bacteria, etc.) will be conducted. And then the program 403 stores test data for each mixing ratio, basic data for each candidate agent for promoting gasification, and additional data from administration tests in the AI learning database. This will involve machine learning and deep learning through mathematical calculations and correction of actual measured values, as well as creating big data. As a result, it is possible to determine the optimal gasification promotion method for the gasification promotion raw material, calculate the raw material mixing ratio, and calculate the optimal dosage for each gasification promoter with high accuracy. Conventionally, it took 180 days, but after developing AI, it can be shortened to 10 seconds per raw material.

Herein, gasification promoters mainly include auxiliary raw materials, nutritional supplements, and promoters. Among these, the auxiliary raw materials do not promote the decomposition of other raw materials. Since the auxiliary raw material has a high methane yield per unit weight, the apparent methane yield per input raw material can be increased by mixing the auxiliary raw materials with other raw materials. On the other hand, the auxiliary raw materials are raw materials that are difficult to undergo methane fermentation as a sole raw material. Examples of auxiliary raw materials are grease trap oil refinery sludge and BDF residue glycerin. Methane gasification can be promoted if the mixing of auxiliary raw materials and food waste is well designed.

Nutritional supplements include Ni, Co, and Fe, which are important for the metabolism of methanogens, but are not sufficiently contained in most raw materials. Adding this will enrich the food with nutrients and increase the rate of fermentation. It is especially effective for food waste. In this case, for example, nutritional supplements are NiCl2 6H2O, CoCl2 6H2O, FeCl2 4H2O, etc., and nutrient solutions have already been commercialized. The optimal amount of nutritional supplements to be added depends on a case-by-case basis, and currently they cannot be used effectively.

There are some reports that promotors are effective in decomposing cellulose. Promotors have the potential to increase methane yields in cellulose-rich agricultural residues like resource crops such as rice straw, rice husk, and dent corn. Promotors may not increase gas emissions from food-based waste. Additionally, it is necessary to separately prepare reaction tank equipment for carrying out the enzyme reaction for several hours to one day. The examples of promotors are cellulase enzymes and rumen fluid.

As shown in Table 500 in FIG. 5(a), as an actual example of bio-gasification promotion using gasification promoters, gas yield was improved when adding auxiliary raw materials (here purified sludge) and when adding nutritional supplements (here Ni, Co). Further, as shown in Table 501 of FIG. 5(b), the amount of biogas generation was increased by adding the gasification promoter. After machine learning, the AI gasification promotion program 403 determines the optimal gasification promotion method according to the type, amount, and properties of food waste, and determines the mixing ratio of raw materials. It also automatically determines the type and optimal input amount of the gasification promoter.

(4) CO2 Reduction IT Calculation Program

The management server 10 estimates the amount of methane gas generated and the amount of CO2 reduction by using the CO2 reduction IT calculation program 404. The management server 10 further calculates the amount of CO2 reduction and the amount that can be converted into carbon credits based on the results of actual biogas utilization at biogas plants. Herein, the management server 10 centrally manages (cloud) the collecting amount of "residual sludge (including purified sludge)" and "food loss" from sources of food waste, the amount of methane gas generated using this as raw material, the amount of power generation and the amount of CO2 reduction by using methane gas, or green hydrogen production volume and CO2 reduction volume. It is noted that the series of the IoT source investigation program 401 to the CO2 reduction IT calculation program 404 is referred to as the methane resource recovery estimation system 400 and convenience can be further improved by showing these as a GUI of a smartphone application.

The first step for turning unused residual sludge and food loss into resources is to convert them into biogas. In terms of biogasification of unused residual sludge and food waste, in order to select the optimal energy conversion equipment and achieve a high utilization rate, highly accurate methane yield prediction, inhibition and synergy prediction of methane fermentation raw materials are indispensable. Therefore, this methane resource recovery estimation system 400 uses cutting-edge AI & IoT technology to scientifically and rationally integrate various individual data.

This system can improve AI prediction accuracy by using deep learning. As a result, the methane resource recovery estimation system 400 as a resource recovery digital transformation service in this area will provide new value to sources of food waste and biogas plants. In addition, it will be possible to maximize the use of food waste as a resource for decarbonization. In the end, this system will be able to contribute to the realization of carbon neutrality by 2050 both domestically and internationally.

Herein, among each terminal device 20, 30, 40 and the management server 10, data such as access methods, metadata, format, measurement units, each designation, and the like are integrated. As a result of this, every client can understand the characteristics of data, and the interoperability of the data has been established.

<Functional Block Diagram>

Figure 6:
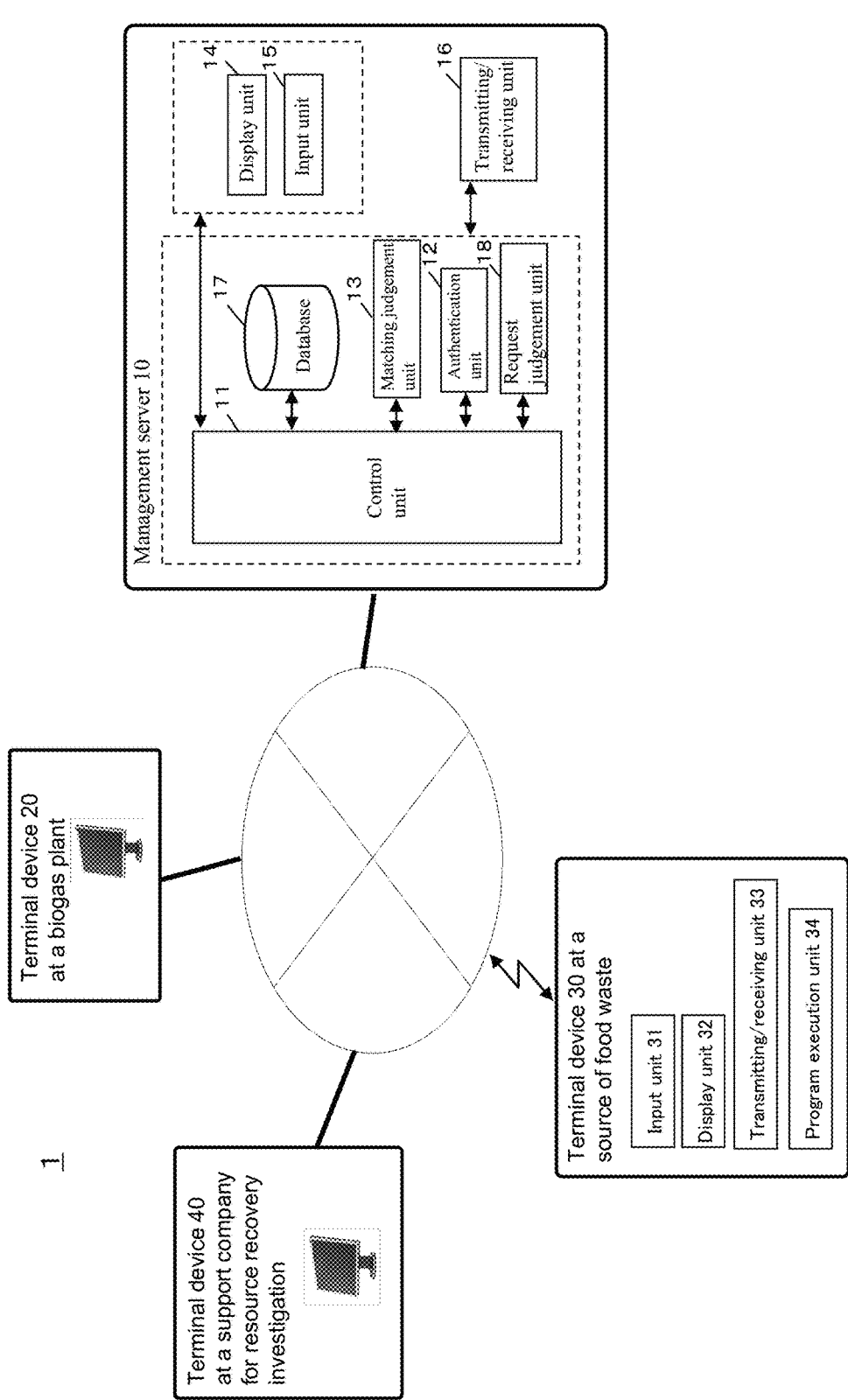
FIG. 6 is a functional block diagram of the methane resource matching system.

Next, the functional block diagram of each processing unit of the matching system 1, according to this embodiment will be explained by referring to FIG. 6.

The terminal device 30 is such as a smartphone and comprises: an input unit 31 using a keyboard function: a screen 32 such as a crystal display: a transaction unit 33, which transacts data between the terminal device 30 and other device such as the terminal device 40 and the management server 10; and a program execution unit 34, which executes an application program. Other terminal devices 20,40 also comprise the same units.

The management server 10 is a terminal such as a computer, and comprises a control unit 11, an authentication unit 12, a matching judgement unit 13, a display unit 14, an input unit 15, a transmitting/receiving unit 16, a database 17, and a request judgement unit 18.

The control unit 11 comprises a CPU (Central Processing Unit) and performs control to realize information processing of the matching system 1, based on a program. Herein, the programs are the four programs mentioned above, namely (1) IoT source investigation program 401, (2) AI methane resource recovery program 402, (3) AI gasification promotion program 403, and (4) CO2 reduction IT calculation program 404.

The authentication unit 12 determines whether member information such as an ID, which was registered at the time of membership registration and was stored in the detabase 17, matches authentication information transmitted from the terminal devices 20, 30, and 40. If it matches, the matching system 1 will start.

The matching judgement unit 13 performs matching among methane gas plants, food waste and emission sources, based on gas production amount, power generation status at the methane gas plant, or request, which are stored in the detabase 17, sent from the terminal device 20 or 40, and the type, amount, and properties of food waste of each food waste source sent from the terminal device 30 or 40. In addition, when matching succeeded, a notification of matching success is sent to the terminal device 20 at the methane gas plant, the terminal device 30 at the source of food waste, and the terminal device 40 at the support company via the transmitting/receiving unit 16.

As described above, the matching in the matching judgement unit 13 may be performed by connecting the food waste that contains the optimal methane material and the source of food waste depending on the operating status at the biogas plant by comparing the type, amount, properties, etc. of food waste (methane materials) registered in the database 17 with the operating status from the biogas plant.

In addition, the matching judgement unit 13 determines the food waste and source of food waste that are most suitable for the biogas plant based on the type and property (example of property: liquid or solid) of the received food waste (methane material), and performs the matching, while using the AI methane resource recovery program that predicts BMP, loss on ignition, carbohydrate content, protein content, lipid content, water content, N concentration, PH, etc., and judges carbohydrate rich, lipid rich, nitrogen/sulfur rich, fiber rich, etc. Specifically, the AI methane resource recovery program judges that carbohydrate rich food waste is suitable for biogas plants that mainly use livestock manure, fiber rich food waste is suitable for biogas plants that mainly use sewage sludge, and sulfur-rich food waste is suitable for biogas plants that mainly use mixed, leftover, and dry methods. And then the program selects the suitable source of food waste.

The database 17 is a memory unit such as a hard disk for storing information such as OS, programs 401 to 404, member information, type/amount/property of food waste owned (including plans) by the source of food waste for each identifier (ID) assigned to the terminal devices 30, 40, biogas Gas production amount or power generation status at the plant, methane gas production capacity and so on. Herein, the information held in the database 17 are not limited to information obtained from the terminal devices 20, 30, and 40 online, but also include information obtained from documents provided offline to the headquarters using the input unit 15.

Figure 7:
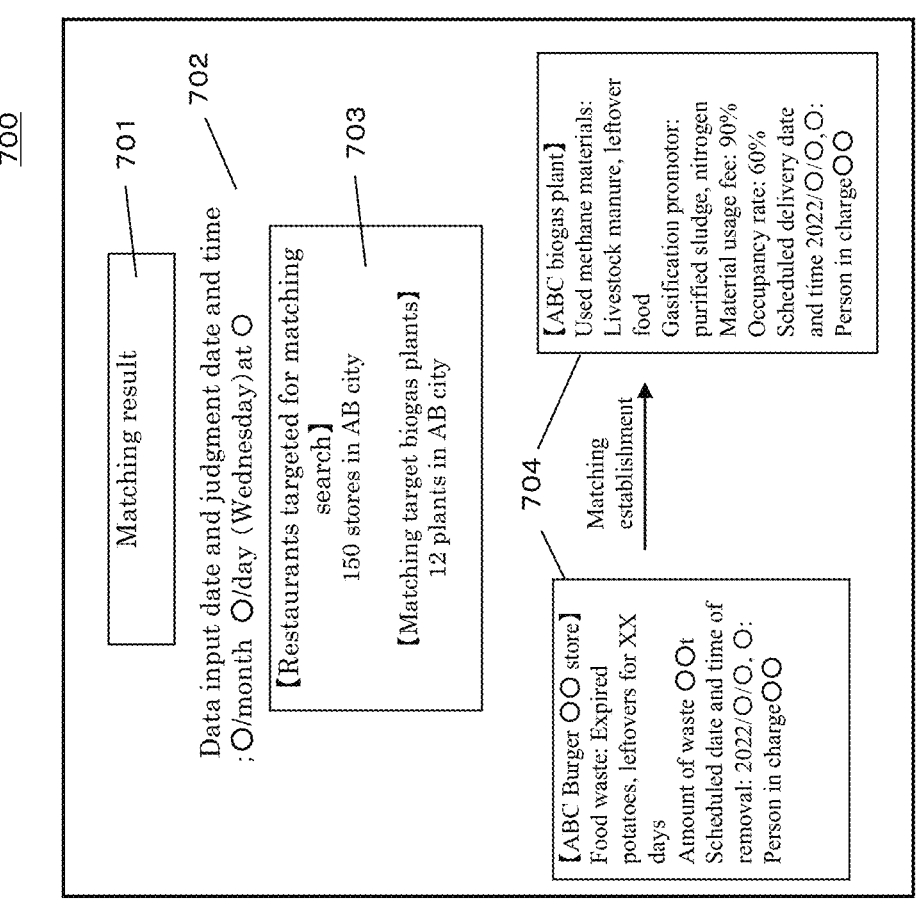
FIG. 7 is a diagram showing an example of a matching screen display of a management server provided in the methane resource matching system.

The display unit 14 is a liquid crystal display panel such as a liquid crystal for displaying processing information. Herein, an example of a screen displayed on the display unit 14 when matching is established, will be described with reference to FIG. 7. As shown in the screen (700) in FIG. 7, the screen for the matching result (701) includes the data input date and judgment date and time (702), the matching target content (703), and the source of food waste and the biogas plant (704), so that the matching completion screen can be checked. After the matching is established, the details of the matching will be notified to each source of food waste and biogas plant.

The input unit 15 is a user interface such as a keyboard for operating information displayed on the display unit 14. In the matching system 1, experts at the headquarters use the input unit 15 to edit information regarding methane materials and biogas plants provided online or offline from the terminal devices 20, 30, 40 and to enter other information.

The transmitting/receiving unit 16 is connected to the Internet, outputs received information and notifications to each processing unit, and outputs information from each processing unit to the Internet. In this embodiment, the transmitting/receiving unit 16 transmits and receives data between the first terminal device 30, the second terminal device 20 and the third terminal device 40.

When receiving a request from the terminal device 20, 30, 40, the request judgement unit 18 judges the content of the request. In addition, when matching is established, the request judgement unit 18 performs a process of transmitting matching details to the matching target terminal devices 20, 30 and the terminal device 40 at the support company. This matching content is processed by a processing request (Http request) to the terminal devices 20, 30, and 40, for example, via the Http protocol. The data format of the HTTP request sent from the transmitting/receiving unit 16 is, for example, XML.

<Sequence Figure>

Figure 8:
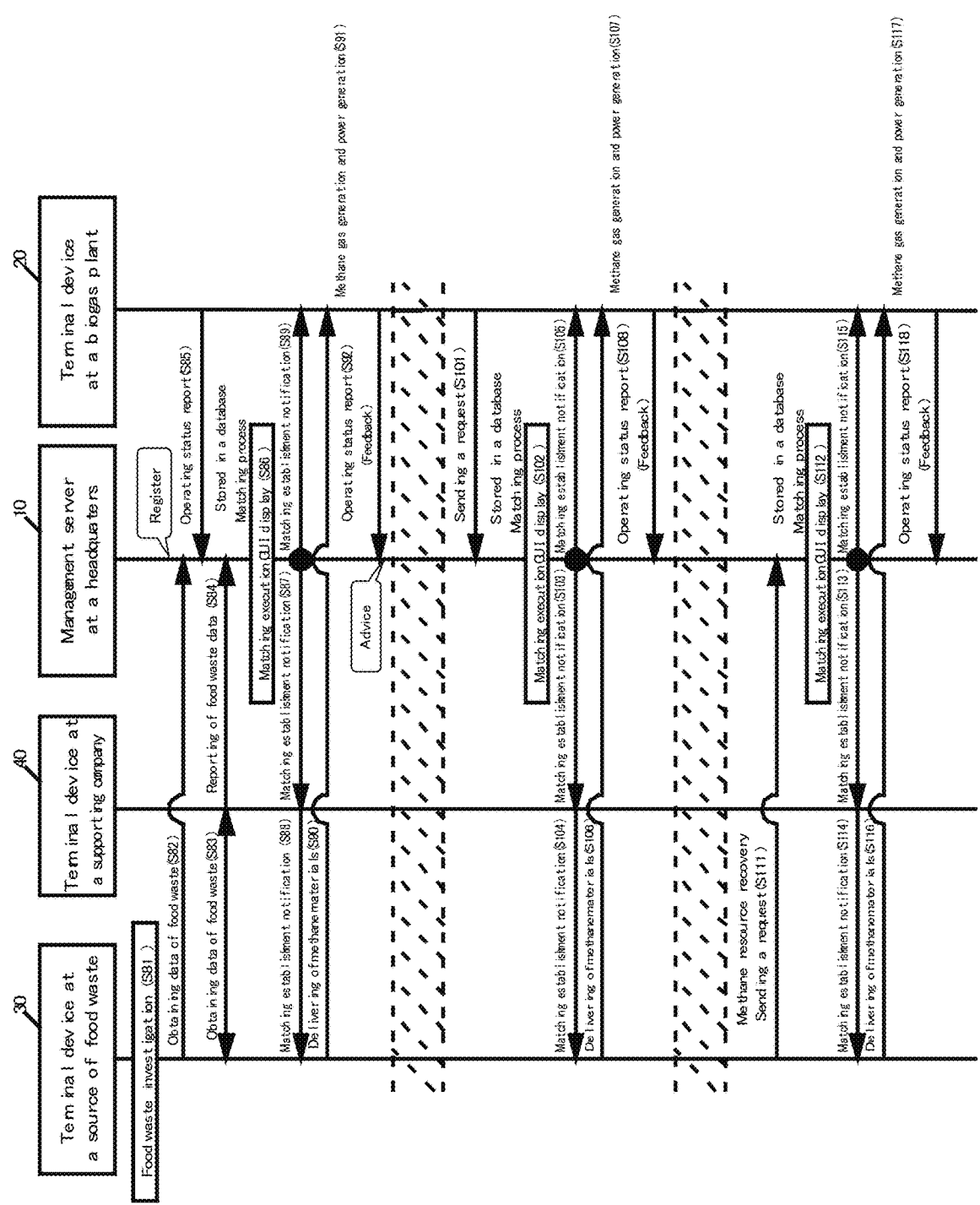
FIG. 8 is a sequence diagram showing operation procedures of the methane resource matching system.

Next, the whole sequence of the matching system 1 according to this embodiment will be explained by referring to FIG. 8. Herein, FIG. 8 is merely an example: therefore, other sequences having a different sequence can be applicable to this system.

First, the support company uses a specialized application installed on the terminal device 40 to obtain photographic data and on-site data regarding residual sludge and food loss at the food waste source (S81). Then these obtained data are sent to the management server 10 via the terminal device 40 (S82). This report is not only made by the terminal device 40 at the support company, but may be made directly by the food waste source via a specialized application installed on the terminal device 20.

Furthermore, if a company that manages an oil/water separation tank at a food factory can also serve as a support company, a specialized application on the terminal device 40 can be used to obtain photographic data of residual sludge and the data on the spot (S83) when the residual sludge is collected from the oil/water separation tank. Then these obtained data are sent to the management server 10 via the terminal device 40 (S84). This report is not only made by the terminal device 40, but may be made directly by the food waste source via a specialized application installed on the terminal device 30.

On the other hand, a methane gas plant reports periodically (for example, once a week, once a day) plant operating status information such as types, amounts, and properties of methane materials, equipment utilization rate, gas production amount, or power generation status to the management server 10 by using a specialized application installed on the terminal device 20 (S85).

Then, the management server 10 estimates the types and amounts of methane material at each food waste source based on the photographic data and acquired data input on the spot based on the above-mentioned IoT source investigation program. And then, the management server 10 comprehensively takes these information and performs matching to determine the optimal combination of food waste sources and biogas plants (S86). In this case, the methane yield based on the methane materials in stock can be estimated and more accurate matching can be achieved by performing synergy prediction and inhibition diagnosis, based on the AI methane resource recovery program mentioned above. Furthermore, more accurate matching can be achieved by calculating the optimal gasification promotion method, raw material mixture ratio, optimal gasification promoter, and optimal dosage based on the AI gasification promotion program.

For those reasons, in the matching system 1, business food waste, which was previously treated as waste, is classified into methane resource characteristics such as carbohydrate-rich and lipid-rich by using the methane resource recovery estimation system, wherein the target customers are food-related businesses that are focusing on ESG, such as restaurant chains, food factories, and commercial facilities. As a result, in this matching system 1, the most suitable methane gas plant is selected based on said characteristics, and services for collection and supply are developed. This will provide food-related businesses with various values such as waste reduction, decarbonization, and processing cost reductions. On the other hand, by supplying the optimal methane materials to individual methane gas plants, values such as stabilizing gas volume and fermentation, reducing operating costs and so on will be created. And the amount of electricity generated will increase in proportion to the increase in gas production, which will contribute to decarbonization. Furthermore, an increase in the amount of biogas generated will also lead to an increase in the production of green hydrogen from non-fossil fuels in the future.

Next, when the matching is established, the management server 10 transmits a matching establishment notification to the terminal device 40 at the management company (S87), as well as the terminal device 30 at the food waste source and the terminal device 20 at the biogas plant (S88, 89). Then, the source that has food waste such as food loss will transport the specified type and amount of food waste to the methane gas plant at the specified date and time, which are described in the matching notification (S90). On the other hand, the methane gas plant starts gas generation and methane power generation based on the methane yield using the methane materials described in the matching notification, synergy prediction and inhibition diagnosis of mixed materials, optimal gasification accelerator, and optimal dosage (S91). Finally, the terminal device 20 feeds back the results of the gas production amount or power generation amount to the management server 10 (S92).

(Variation 1)

The sequence of the methane resource recovery matching system 1 according to the variation 1 of the present embodiment will be described with reference to FIG. 8. In this variation 1, first, a material request is transmitted from the terminal device 20 at the biogas plant, that is in short supply of methane material, to the management server 10 (S101). Then, the management server 10 performs the same matching as described above (S102), and sends a matching notification to the terminal device 40 at the management company (S103), as well as the terminal device 30 at the food waste source such as a food factory and the terminal device 20 at the biogas plant (S104, 105). Next, the food factory that has food waste such as food loss starts transporting the specified type and amount of food waste to the methane gas plant described in the matching notification (S106). Finally, the methane gas plant starts gas generation and methane power generation (S107), and feeds back the results of the gas generation amount or power generation amount from the terminal device 20 to the management server 10 (S108).

(Variation 2)

The sequence of the methane resource recovery matching system 1 according to the variation 2 of the present embodiment will be described with reference to FIG. 8. In this variation 2, first, a methane resource recovery request of food waste is transmitted from the terminal device 30 holding food waste to the management server 10 (S111).

Then, the management server 10, which receives this methane resource recovery request, performs a matching process based on an IoT source investigation program (S112), and identifies a biogas plant that is most compatible with the held food waste. Then, the management server 10 transmits the matching (details of food waste that can be converted into methane material) to the terminal device 40 at the support company, the terminal device 30 at the food factory, and the terminal device 20 at the biogas plant (S113, 114, 115). Then, the food factory, which has received the matching notification, transports the food waste to the biogas plant based on the description content (S116). Finally, the biogas plant, which has received the methane materials, starts gas generation and methane power generation (S117), and feeds back the results of the gas generation amount or power generation amount from the terminal device 20 to the management server 10 (S118). It is noted that matching is not always possible, and if matching is not possible, a notification that says the matching failure may be sent and an alternative plan (for example, possible after one month and the like) may be provided.

As mentioned above, the methane resource matching system 1 is a methane resource matching system utilizing food waste, which matches food waste as a biomass resource and a source of the food waste with a biogas plant that performs bio-gasification using the food waste, the methane resource matching system utilizing food waste comprises: a first terminal device 30 that is equipped at the source of food waste, and that inputs information relating to food waste: a second terminal device 20 that is equipped at the biogas plant, and that inputs information relating to an operating status at the biogas plant: a third terminal device 40 that is equipped at a support company, which investigates the source of food waste and the biogas plant and that inputs information relating the food waste at the source and the operating status at the biogas plant; and a management server 10 that is equipped at a general headquarters, which oversees the bio-gasification of food waste, and that manages the source of food waste, the biogas plant and the bio-gasification of food waste at the support company, wherein the first terminal device 30, the second terminal device 20, the third terminal device 40 and the management server 10 are connected to one another via the network.

With this configuration, as for waste food to be discharged (methane material), the methane resource matching system 1 optimally matches sources of the food waste (methane material) with biogas plants that convert the food waste into methane gas, based on the classification of methane resources by the AI methane resource recovery diagnosis and estimation system. As a result, this can improve operating rate at biogas plants and contribute to the realization of a decarbonized society in the end. In other words, the management server 10 centrally manages the conditions of sources of food waste and biogas plants and can improve the operating rate and productivity of biogas plants. Additionally. IoT will be used to connect clients among biogas plants, headquarters, food restaurants and food factories. It will make on-site work more efficient, solve the problem of labor shortages in the industry, and even help expand commercial parks and strengthen brand power.

In addition, as shown in FIG. 9, among policies aimed for achieving the country's 2050 carbon neutrality goal, in order to achieve the energy mix covered by methane power generation, it is necessary to increase the amount of business-related food waste processed from the current 80,000 tons/year to 1.2 million tons/year.

If the recycling rate of business-related food waste is increased by 30% through new services using tools such as the matching system 1, it will be possible to reduce $CO_2$ emissions by more than 20,000 tons per year.

Furthermore, not only will business-related food waste be effectively used as energy by a methane gas business in the suburbs, but relationships will also be strengthened with surrounding pig farmers and vegetable farmers who use liquid fertilizer. Due to this, it can also contribute to the construction of a regional circulation. In addition, biogas can play an important role in achieving carbon neutrality by 2050 in urban areas, rural areas, and livestock farming areas (Examples: Generation of green hydrogen by reforming biogas, generation of carbon-neutral methane from biogas+ hydrogen, mixed usage by directly introducing biogas into existing gas infrastructure and so on).

Furthermore, the methane resource matching system 1 can improve the interoperability of data related to the biogasification potential of food waste, which used to be dispersed, by using specialized applications and IoT. It is to be noted that the present disclosure is not limited to the above-described embodiments and modified examples, and various modifications are possible within the spirit and scope of the present disclosure.

Furthermore, in order to achieve the above objects as the methane resource matching system utilizing food waste, it is also possible to embody the present disclosure determining method that includes, as its steps, the characteristic units included in such the methane resource matching system, and as a program causing a computer to execute such steps. It should be also noted that such program can be distributed on a recording medium such as a USB and over a transmission medium such as the Internet.

REFERENCE SIGNS LIST

1: methane resource matching system
10: management server at a headquarters
11: control unit
13: matching judgement unit
17: database
20: terminal device (second terminal device)
30: terminal device (first terminal device)
31: input unit
32: display unit
33: transmitting/receiving unit
34: program execution unit
40: terminal device (third terminal device)
401: IoT source investigation program
402: AI methane resource recovery program
403: AI gasification promotion program
404: CO2 reduction IT calculation program

What is claimed is:

1. A methane resource matching system comprising:

a management server comprising at least one processor and a memory storing instructions that, when executed by the processor, cause the processor to:

receive, from a plurality of smartphones located at food waste sources, input data associated with food waste collected at the food waste sources, the input data comprising volume data, moisture content data, chemical composition data, photographic data, type data, quantity data, and property data of the food waste;

process the input data using a method resource recovery model to estimate parameters for bio methane potential, loss on ignition, carbohydrate content, protein content, lipid content, water content, nitrogen concentration, and pH of the food waste;

classify the food waste, based on the estimated parameters, into a plurality of methane resource comprising a carbohydrate-rich classification, a fat-rich classification, a nitrogen/sulfur-rich classification, and a fiber-rich classification;

receive operating status data from a plurality of biogas plant terminal devices, each biogas plant terminal device of the plurality of biogas plant terminal devices being associated with a different biogas plant of a plurality of biogas plants, the operating status data comprising at least gas production amount, power generation status, and types and properties of methane materials used at respective biogas plants;

determine compatibilities between the classified food waste and the plurality of biogas plants by applying a methane resource recovery estimation model that performs at least one of methane yield prediction, synergy prediction, and inhibition diagnosis based on the classifications and the operating status data;

determine, based on the compatibilities, at least one of a mixing ratio of the food waste with existing methane materials and a type or amount of gasification promoter for improving methane production;

generate allocation instructions that specify at least a selected biogas plant and a corresponding type and amount of food waste to be supplied based on the determined compatibilities and mixing ratio;

transmit the allocation instructions to the plurality of biogas plant terminal devices to coordinate food waste distribution to the plurality of biogas plants, and receive, from at least one of the plurality of biogas plant terminal devices, feedback data comprising at least gas production amount or power generation amount resulting from supplied food waste, and update the methane resource recovery estimation model based on the feedback data to improve accuracy of methane yield prediction.

2. The methane resource matching system of claim 1, wherein the processor is further configured to:

predict a methane yield for each biogas plant of the plurality of biogas plants using the methane resource recovery estimation model; and adjust future allocation instructions based on a comparison between predicted methane yield and actual methane yield data.

3. The methane resource matching system of claim 1, wherein the operating status data comprises a type of methane material, an amount of methane material, a property of methane material, an equipment utilization rate, a gas production amount, and a power generation status.

4. The methane resource matching system of claim 1, wherein the processor is further configured to implement an artificial intelligence gasification promotion model that determines at least one of (i) mixing ratios of different food waste classifications to maximize methane production efficiency at each biogas plant of the plurality of biogas plants or (ii) a type or amount of a gasification promoter to improve methane production efficiency at each biogas plant of the plurality of biogas plants.

5. The methane resource matching system of claim 1, wherein in being configured to determine the compatibilities, the processor is configured to:

identify a biogas plant experiencing a nitrogen or sulfur deficiency; and prioritize allocation of the food waste classified in the nitrogen/sulfur-rich classification to the identified biogas plant.

6. The methane resource matching system of claim 1, wherein the processor is further configured to determine carbon credits based at least in part on methane production data from the plurality of biogas plants.

7. The methane resource matching system of claim 1, wherein the allocation instructions comprising:

scheduling collection of the food waste, specifying a type and amount of the food waste to be transported, and identifying a destination biogas plant of the plurality of biogas plants to receive the food waste.

8. The methane resource matching system of claim 1, wherein determining the compatibilities comprises:

evaluating, using the methane resource recovery estimation model, at least one of (i) an inhibition condition associated with nitrogen, sulfur, or lipid content or (ii) a synergistic interaction between different food waste classifications to maintain stability of methane fermentation at each biogas plant.

9. The methane resource matching system of claim 1, wherein determining the mixing ratio comprises:

calculating a mixing ratio of the food waste with existing methane materials based on predicted methane yield and inhibition conditions to improve gas production efficiency at the selected biogas plant.

10. The methane resource matching system of claim 1, wherein processing the input data further comprises:

applying machine learning to generate the methane resource recovery estimation model based on historical data including methane yield, gas production amount, and properties of previously processed food waste.

11. The methane resource matching system of claim 1, wherein updating the methane resource recovery estimation model comprises:

modifying at least one parameter of the methane resource recovery estimation model based on the feedback data to improve prediction accuracy for methane yield associated with the classified food waste.

12. The methane resource matching system of claim 1, wherein the processor is further configured to generate the methane resource recovery estimation model by training the model using machine learning based on historical data comprising methane yield, gas production, and properties of previously processed food waste, and to iteratively update the model using feedback data from the plurality of biogas plants to refine prediction of methane yield, synergy, and inhibition conditions.

* * * * *